July 4, 1933. H. JANSSEN 1,916,220
MEAT PACKING DEVICE
Filed Sept. 29, 1931
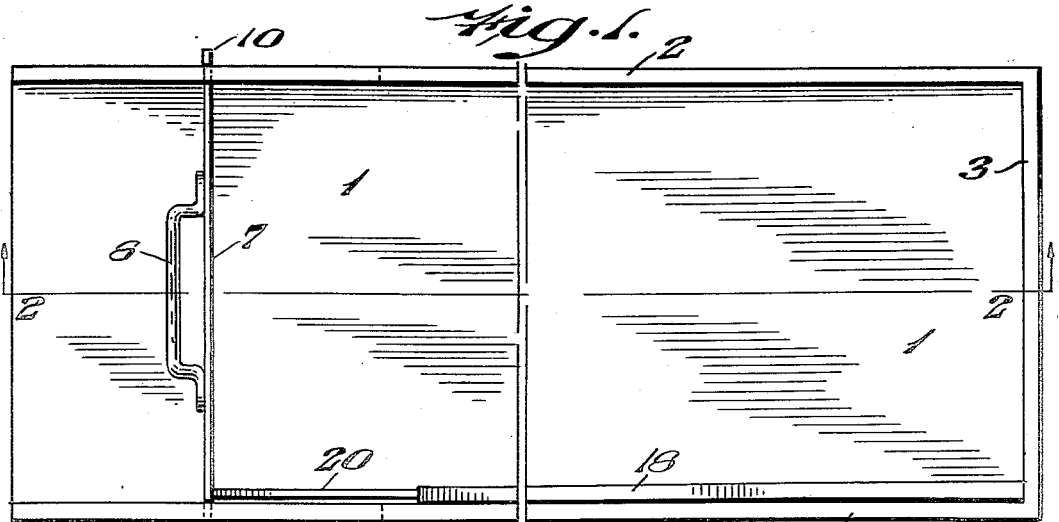
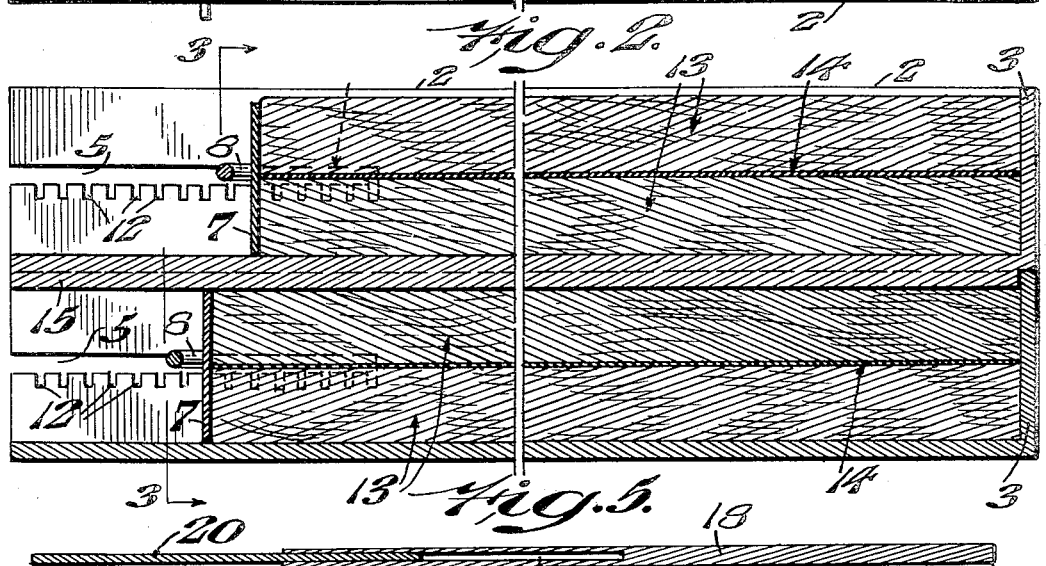
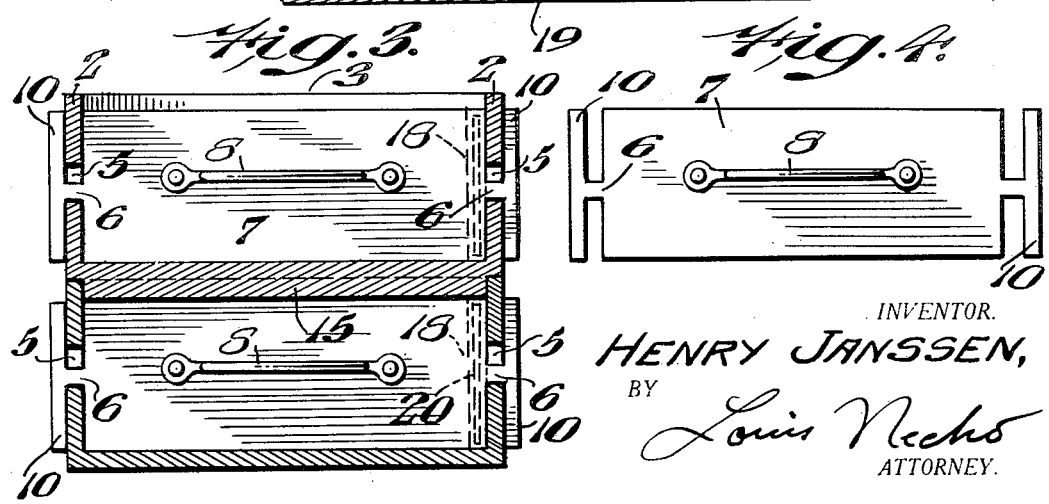
INVENTOR.
HENRY JANSSEN,
BY
ATTORNEY.

Patented July 4, 1933

1,916,220

UNITED STATES PATENT OFFICE

HENRY JANSSEN, OF PHILADELPHIA, PENNSYLVANIA, ASSIGNOR OF ONE-HALF TO GUSTAVE F. KUHN, OF PHILADELPHIA, PENNSYLVANIA

MEAT PACKING DEVICE

Application filed September 29, 1931. Serial No. 565,763.

My invention relates to a new and useful meat packing box whereby the meat may be molded under pressure to a predetermined form and predetermined size.

In packing bacon for instance, it is desirable to have the meat packed under pressure into rectangular boxes of a predetermined size and it is further desired that a plurality of such boxes or forms be produced at the same time.

To the above ends, I have produced a novel mold or form, in which the meat can be packed into the shape and size desired and in which the weight of the super-imposed forms or molds serves to apply pressure to the form below, thereby utilizing the force of gravity to aid in the pressure of the meat being packed or molded.

My invention further relates to other novel features of construction and advantage all as hereinafter described and claimed in connection with the accompanying drawing in which:

Fig. 1 represents a plan view of a packing or molding box embodying my invention.

Fig. 2 represents sectional view on line 2—2 of Fig. 1, showing the manner of superimposing a plurality of packing or molding boxes.

Fig. 3 represents the section on line 3—3 of Fig. 2.

Fig. 4 represents an end view of the pusher or pressure applying device shown at the left hand portion of Figs. 1, 2 and 3.

Fig. 5 shows a sectional view of a telescoping filler, which may be used to aid in molding the desired form of the meat being molded in a manner hereinafter described.

Referring to the drawing in which like reference characters indicate like parts, my novel packing or molding box comprises the bottom 1, sidewalls 2 and the rear wall 3, which may be of any desired height, the front end of the box being open. The front ends of the sidewalls are slotted as at 5 to form guides for the reduced portion 6 of the pusher 7 which is provided with a manipulating handle 8. The reduced portion 6 of the pusher 7 terminates in the outer vertical braces 10, which abut against the outer sides of the front slotted ends of the sidewalls 2 to reinforce the latter in a manner and for the purpose hereinafter set forth. In the slots 5 of the sidewalls 2 is provided a toothed or serrated portion 12 to receive and engage the reduced portion 6 of the pusher 7 to lock the latter in any desired adjusted position.

The operation is as follows:

The meat to be packed and molded is shown at 13 and may consist of a single block or it may consist of two sections separated by the paper or other partition 14. The meat 14 fills the box or packing mold to the top thereof, and another packing box is placed down on the top of the meat with the drop bottom 15 of the upper box extending directly into the lower box (see Fig. 5) to bear against and compress the upper surface of the meat therein. The pusher 7 is then held by the handle 8 in an upper position to disengage the reduced portion 6 thereof from the serrated or toothed portion 12, and is pressed against the meat as tightly as possible, and when the desired degree has been reached, the pusher 7 is slightly lowered to engage the reduced portion 6 thereof with the serrated portion 12 thus maintaining the pusher 7 in a tightly clamped position against the meat to compress the latter. The position of the parts thus far described is shown in Fig. 2.

If the meat being molded or formed is not sufficient to completely fill the box or if it is desired to form a mold slightly smaller than the internal capacity of the box, the telescoping filler illustrated in Fig. 5 may be used, which consists of a strip of metal or other material 18, slotted to any desired extent as at 19 and adapted to receive the sliding member 20, so that the length of the filler may be adjusted to any desired length. The manner of employing the filler is best shown in Fig. 1, where it is shown laid along one of the sidewalls 2, which position is again illustrated clearly in Fig. 3. The thickness of the filler, or the number of fillers used is a matter of discretion, it being understood that a filler 18, 20, is used against each of the side walls 2, the placing of one filler 18 in Figure 1 against one of the side walls 2 being merely illustrative.

By referring to Figs. 2 and 3, it will be seen that the meat in a lower box is compressed vertically by the pressure caused by the weight of a super-imposed box, the bottom of which rests directly on the meat in the box below and the meat is then further compressed by the pusher 7 which is pressed to exert lateral compression on the meat and then locked in a position in the serrated portion 12 of the sidewalls 2, thus producing a compact and tightly packed block of meat conforming to the size and the form of the packing box with or without the use of the filler illustrated in Fig. 5.

Having thus described my invention, what I claim as new and desire to secure by Letters Patent is:

1. A meat packing device comprising a bottom, side walls and an end wall, the front ends of said side walls being provided with toothed horizontal slots and a pusher adapted to close the space between said side walls and having a reduced portion adapted to engage said toothed slots and outer vertical braces for reinforcing the front portions of said side walls.

2. A meat packing device comprising a bottom, side walls and an end wall, the front ends of said side walls being provided with toothed horizontal slots and a pusher adapted to close the space between said side walls and having a reduced portion adapted to engage said toothed slots and outer vertical braces for reinforcing the front portions of said side walls, said bottom extending downwardly below the bottom edges of said side walls.

In testimony whereof I affix my signature.

HENRY JANSSEN.